Figure 1:
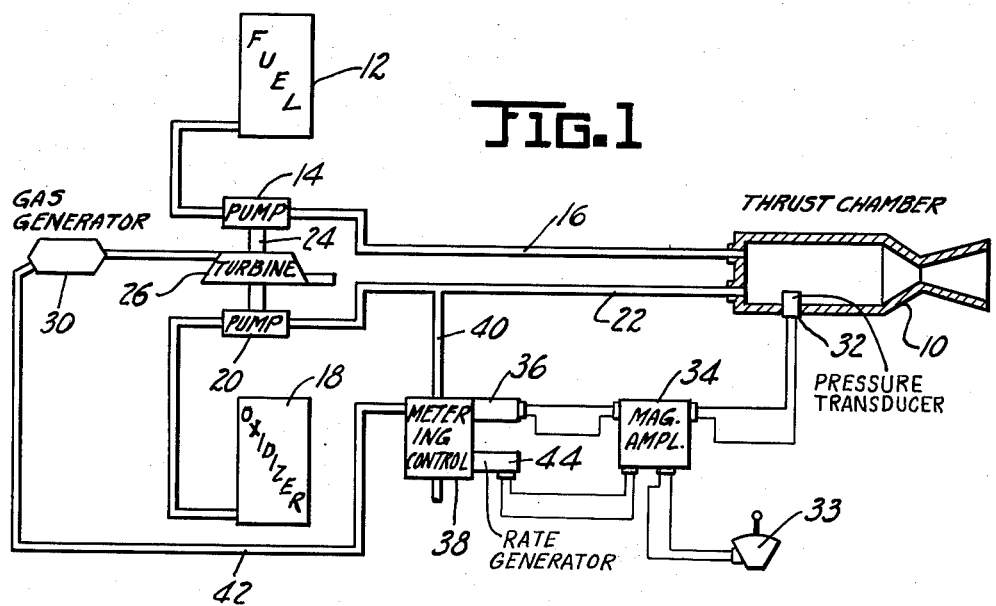

INVENTORS
JOHN R. WILLIAMSON
CARL D. HAWK
BY
*Robert C. Smith*
ATTORNEY

United States Patent Office 3,040,522
Patented June 26, 1962

3,040,522
ROCKET ENGINE CONTROL SYSTEM
John R. Williamson and Carl D. Hawk, South Bend, Ind., assignors to The Bendix Corporation, a corporation of Delaware
Filed Sept. 12, 1958, Ser. No. 760,599
4 Claims. (Cl. 60—35.6)

This invention relates to servo systems and more particularly to a servo-operated system especially adapted to the metering of certain oxidizers and monopropellants supplied to rocket engines.

Rocket engines presently in use often require a single fuel or an oxidizer such as hydrogen peroxide or nitric acid either of which may be very corrosive and difficult to contain. In some of the previously known systems, an attempt has been made to meter such fluid by means of servo-operated controls in which the force multiplying system or hydraulic amplifier uses a conventional hydrocarbon servo fluid. In such cases it becomes necessary that very effective dynamic seals be provided between chambers containing hydraulic oil and such substances as hydrogen peroxide because of the danger of combustion within a control system itself. These seals have proved to be troublesome, both because of the power required to operate members through them and because of the hysteresis effects which they produce leading to difficult calibration problems. Also they have often contributed undesirable size and weight to the system. It has therefore been determined that the problems connected with such seals justify the expense and difficulty of using the highly corrosive metered liquids to power the control servo system. When this is done, a certain percentage of the fuel or oxidizer is withdrawn from the main stream of flow and diverted into the servo system. The exhaust flow from the servo system is then ordinarily directed into the stream of metered flow downstream of the metering valve. This obviously results in some calibration problems which may be sufficiently severe in applications using small metered flows that it becomes necessary to dump the servo exhaust flow overboard rather than to attempt to return it to the metered flow line. For such applications it has been found to be desirable to incorporate a small gas generator or catalyst bed in or near the metering units so that the servo system can be powered with the gaseous products of decomposition of the metered liquid. This system is advantageous because a much greater energy level is obtained from the decomposed liquid thereby substantially reducing the quantity of such liquid which must be withdrawn from the fuel or oxidizer flow conduit. Where hydrogen peroxide is used, there is a further advantage that the products of decomposition which are dumped overboard, being water and excess oxygen, are essentially innocuous. It is therefore an object of the present invention to provide a metering control for oxidizers or monopropellants including a servo system operated with the gaseous products of decomposition of the metered liquids.

It is another object to provide a metering control for oxidizers and monopropellants in which the metered liquids are used to operate the servo system of the control but the amount of such liquid withdrawn is reduced to a minimum and need not be reintroduced into the metered flow.

It is another object of the present invention to provide a metering unit for oxidizers and monopropellants in which a small gas generator is incorporated into the metering control unit for converting the metered liquid into a gas possessing considerable energy in the form of heat and pressure.

It is a further object of the present invention to provide a metering control for oxidizers and monopropellants in which the material metered is also used to provide power for the control servo system wherein the exhaust flow from the servo system is sufficiently small that it may be disposed of overboard without substantial loss in performance or range of the associated engine.

It is a further object to provide the metering control incorporating the objects in which the product of decomposition of the metered liquid may be dumped overboard without danger to personnel working with the associated engine.

Figure 2:
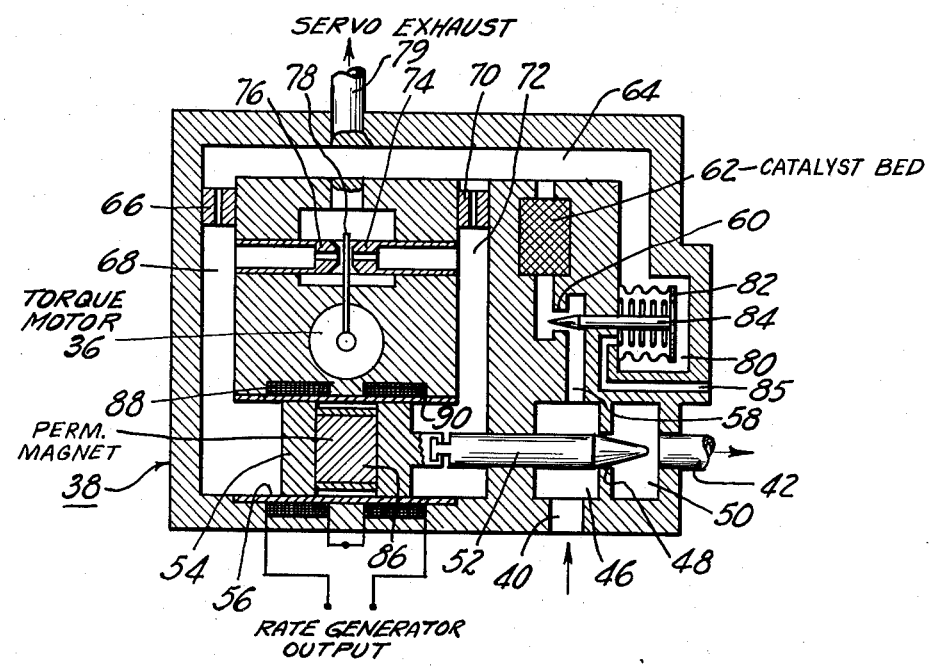

Other objects and advantages will occur to those skilled in the art from the following specification taken in connection with the accompanying drawings in which:

FIGURE 1 is a schematic drawing of a propellant system for a rocket engine using the present invention; and
FIGURE 2 is a cross sectional view of the metering control of FIGURE 1.

Referring to FIGURE 1, the thrust chamber of a rocket engine is shown generally at numeral 10. By way of example, the present invention is shown herein in connection with a metering system for an engine using a two-fuel arrangement, wherein the oxidizer used is hydrogen peroxide. Actually, the invention is applicable to any metering system using an oxidizer or monopropellant capable of being decomposed into a gas through catalytic action. This thrust chamber is supplied with fuel from a fuel source 12 through a pump 14 at a line 16 and an oxidizer such as hydrogen peroxide from a source 18 through a pump 20 and a conduit 22. The pumps 14 and 20 are connected with a common shaft 24 driven by a turbine 26 which, in turn, is driven by the hot gas output emanating from a gas generator 30. Inasmuch as the pumps 14 and 20 are driven by the same turbine 26, a constant proportion of fuel and oxidizer is supplied to the thrust chamber for combustion therein. Combustion in the thrust chamber 10 results in the creation of a fluid pressure which is sensed by means of a pressure transducer 32 and this pressure signal, which varies in substantially direct proportion to the thrust output of the chamber 10 is connected to an amplifier 34 where it is compared with a thrust reference signal requested by a power lever 33 to produce a thrust error signal, the error signal is amplified, and the amplified signal is used to control a torque motor 36 forming part of an electro-hydraulic control unit 38. The details of the amplifier 34 are not described herein, it being considered that one skilled in the art could adapt any of several commercially available amplifiers to a control system such as that shown herein. One such amplifier is shown in the Patent No. 2,841,336 issued to Lyle Martin and assigned to the assignee of the present application. The amplifier shown in said patent is a magnetic amplifier having a torque motor output and including a rate generator connected to a metering valve and a set of signal windings for receiving the output of the rate generator. The pressure transducer 32 is, or may be, a device available on the open market and may consist of a pressure responsive member such as a bellows which acts to upset the balance of a Wheatstone bridge to provide an output signal to the amplifier 34. The electro-hydraulic control unit 38 is connected to receive as a fluid input through a conduit 40 a portion of the output of oxidizer (hydrogen peroxide) from pump 20 which flows through conduit 22. The output of the metering unit 38 is a metered flow of oxidizer through a conduit 42 to the gas generator 30. Where hydrogen peroxide is used, the gas generator 30 causes the hydrogen peroxide to be decomposed into steam and surplus oxygen at a very high temperature which is used to rotate the turbine 26. The hydraulic control 38 also includes a rate generator 44 which provides a feedback signal to the amplifier 34.

FIGURE 2 shows the electro-hydraulic control unit 38 including torque motor 36, the fluid amplifier circuit including the gas generating system, and the metering valve and rate generator section. Hydrogen peroxide is supplied to the inlet conduit 40 where it enters a chamber 46, flows across a metering orifice 48 into an outlet chamber 50, and out of outlet conduit 42. A metering valve member 52 which acts to vary the effective area of orifice 48 is moved axially by means of a piston 54 positioned in the cylinder 56. A portion of the flow entering chamber 46 flows into a conduit 58, across a metering orifice 60, and into a small gas generator or catalyst bed 62 which may consist of a series of alternate silver and corrosion resistant stainless steel screens. The operation of the catalyst bed 62 is such as to cause the liquid hydrogen peroxide to be decomposed into a gas, actually steam and excess oxygen at very high pressure and temperature, which is supplied to a conduit 64 and from thence through a bleed 66 and a conduit 68 to the cylinder 56 on the left side of piston 54 and through a bleed 70 and a conduit 72 to the cylinder 56 on the right side of piston 54. Also in communication with conduits 68 and 72 are a pair of control orifices 74 and 76 and positioned between them is a flapper valve member 78 which is actuated by means of a torque motor 36 which is caused to assume a position midway between these orifices when it is desired that the control pressure on both sides of piston 54 be the same. The gas flowing through these orifices is then exhausted overboard through a conduit 79. Should a signal be supplied to torque motor 36 which causes the flapper member to move toward orifice 74 the pressure will then build up in conduit 72 and in cylinder 56 on the right hand side of piston 54 thereby causing the valve member 52 to be withdrawn from the orifice 48 and increasing the effective area thereof. Movement of the flapper valve 78 toward the orifice 76 causes an increase in the pressure acting against the left end of piston 54 resulting in the moving of valve 52 in a closing direction. Conduit 64 also communicates with a chamber 80 containing a spring loaded bellows 82 carrying a needle valve member 84 which acts to vary the effective area of orifice 60. The interior of bellows 82 is in communication with the atmosphere or a desired reference pressure through a conduit 85. This assembly acts as a pressure regulator for the servo system, wherein a high pressure of the gas appearing in chamber 80 results in a collapsing of the bellows member 82 and the reducing of the effective area of orifice 60. This, of course, reduces the amount of liquid hydrogen peroxide which can reach the gas generator 62. Should the general pressure level sensed in chamber 80 be reduced, the bellows 82 expands thereby pulling needle valve 82 out of the orifice 60, increasing its effective area, and allowing more liquid hydrogen peroxide to reach the gas generator 62.

The rate generator 44 is composed of the piston 54 which has embedded therein a permanent magnet 86 which is inductively related with a pair of coils of wire 88 and 90 wound around the outside of cylinder 56 in the housing of member 38. Movement of the valve member 52 and piston 54 and hence the permanent magnet 86, will result in a voltage being generated in windings 88 and 90 varying in polarity with the direction of movement and in magnitude to the speed of movement of the magnet 86. A linear rate generator of the type shown herein is described in considerable detail in U.S. Patent No. 2,842,688 issued to Lyle Martin (common assignee). Used in the environment in the present application it is necessary that the permanent magnet 86 be protected from contact with the hydrogen peroxide in the system and this is accomplished by enclosing it in the interior of the piston 54, said piston being fusion welded together after the magnet is placed therein.

In discussing the operation of the system shown herein, it will first be assumed that no change is taking place and that the system is stabilized at a value of thrust output which is equal to that requested on the power lever 33. Under these conditions the output of the pressure transducer is balanced by the reference signal established by the power lever 33 and no output is supplied to the torque motor 36 from the amplifier 34. Under these conditions the flapper valve member 78 is maintained in the centered position as shown. The gas pressure applied against each side of piston 54 is exactly the same and the metering valve 52 is held in a stationary position. A change in the value of the thrust output in chamber 10 or a change in the position of the power lever 33 will result in an unbalance or error signal emanating from amplifier 34 which is supplied to the torque motor 36. Let us assume that the signal supplied to the torque motors of such polarity as to cause the flapper valve to be moved toward the orifice 74. This results in an increase in the pressure of the high energy gas acting against the right hand end of piston 54 and causes said piston to move toward the left thus increasing the effective area of the metering orifice 48 and causing a larger flow of hydrogen peroxide to the gas generator 30. Movement of the piston 54 also causes the magnet 86 to be moved to the left thereby generating a voltage in windings 88 and 90 which is applied to the amplifier 34 as a feedback or stabilization signal. The increasing flow from outlet 42 to the gas generator 30 results in a generation of a larger amount of high temperature steam and oxygen to drive the turbine 26 which means that more energy is available to drive the pumps 14 and 20 and these pumps will then supply a greater amount of fuel and oxidizer to the thrust chamber 10. When the error signal is of such polarity as to cause the torque motor to move in the opposite direction against orifice 76, the opposite result would be obtained, the flow through conduit 40 being decreased and the output from the gas generator 30 being decreased.

While only one embodiment is shown and described herein, modifications may be made to suit the requirements of particular applications.

We claim:

1. A device for metering a propelling liquid for a rocket engine comprising a conduit, a metering valve in said conduit, a cylinder and a piston slidable therein operatively connected to said valve, a torque motor device including means defining first and second orifices and a flapper valve movable between said orifices, first and second passage means connecting said first and second orifice means with said cylinder on opposite sides of said piston, a catalyst bed connected to receive said liquid from said conduit upstream of said metering valve for decomposing said liquid into a gas at a high temperature, first and second passages connecting the downstream side of said catalyst bed with said first and second passage means, restrictions in each of said first and second passages, a regulating valve connected to control the liquid flow to said catalyst bed, means responsive to the gas pressure downstream of said catalyst bed for operating said regulating valve, a voltage generating device including a permanent magnet inclosed in the interior of said piston and a coil of wire associated with said cylinder for producing a feedback signal which varies as a function of the position of said piston, and control means responsive to a condition related to thrust output of said engine and said feed back signal for controlling the operation of said torque motor device.

2. A device for metering a propelling liquid for a rocket engine comprising a conduit, a metering valve in said conduit, a cylinder and a piston slidable therein operatively connected to said valve, a torque motor device including means defining first and second orifices and a flapper valve movable between said orifices, first and second passage means connecting said first and second orifice means with said cylinder on opposite sides of said piston, a catalyst bed connected to receive said liquid from said conduit upstream of said metering valve for decomposing said liquid into a gas at a high temperature, first and second passages connecting the downstream side of said catalyst bed with said first and second passage means, restrictions in each of said first and second passages, a regulating valve connected to control the liquid flow to said catalyst bed, means responsive to the gas pressure downstream of said catalyst bed for operating said regulating valve, and means responsive to a condition related to thrust output of said engine for controlling the operation of said torque motor device.

3. A device for metering a propelling liquid for a rocket engine comprising a conduit, a metering valve in said conduit, a cylinder and a piston slidable therein operatively connected to said valve, a torque motor device including means defining first and second orifices and a flapper valve movable between said orifices, first and second passage means connecting said first and second orifice means with said cylinder on opposite sides of said piston, a catalyst bed connected to receive said liquid from said conduit upstream of said metering valve for decomposing said liquid into a gas at a high temperature, valve means for controlling the flow of liquid from said conduit to said catalyst bed, pressure differential responsive means operatively connected to said valve means for actuating the same, said pressure differential responsive means being responsive to the differential between a reference fluid pressure and the gas pressure downstream of said catalyst bed, first and second passages connecting the downstream side of said catalyst bed with said first and second passage means, restrictions in each of said first and second passages, and means responsive to a condition related to thrust output of said engine for controlling the operation of said torque motor device.

4. A device for metering a propelling liquid for an engine comprising a conduit, a metering valve in said conduit, movable wall means operatively connected to said metering valve, a permanent magnet enclosed by said movable wall means and movable therewith, a coil of wires surrounding said movable wall means and fixed in position relative thereto, said permanent magnet and said coil of wire being operative to produce an electrical output signal representative of the rate of movement of said movable wall means, a control device including means defining first and second orifices and a flapper valve movable between said orifices, first and second passage means connecting said first and second orifice means with opposite sides of said movable wall means, a catalyst bed connected to receive said liquid from said conduit upstream of said metering valve for decomposing said liquid into a gas at a high temperature, first and second passages connecting the downstream side of said catalyst bed with said first and second passage means, restrictions in each of said first and second passages, means responsive to a condition representative of thrust output of said engine for producing an electrical output signal corresponding to said thrust output, and control means responsive to said first and second named electrical output signals for controlling said control device to determine the effective position of said flapper valve.

References Cited in the file of this patent

UNITED STATES PATENTS

| | | |
|---|---|---|
| 1,850,133 | Munzinger | Mar. 22, 1932 |
| 2,043,453 | Vickers | June 9, 1936 |
| 2,584,127 | Harcum et al. | Feb. 5, 1952 |
| 2,605,609 | Bush | Aug. 5, 1952 |
| 2,697,417 | Mayer | Dec. 21, 1954 |
| 2,734,340 | Wood | Feb. 14, 1956 |
| 2,842,688 | Martin | July 8, 1958 |
| 2,844,936 | Fowler et al. | July 29, 1958 |
| 2,866,476 | Orloff | Dec. 30, 1958 |

OTHER REFERENCES

Rocket Propulsion Elements, 2nd Edition, by Sutton; John Wiley & Sons, Inc., 1956, pages 298 and 299 relied on.